Dec. 17, 1957 F. K. BOWERS 2,817,061

ASYMMETRICAL DELTA MODULATION SYSTEM

Filed June 7, 1955

INVENTOR
F. K. BOWERS
BY
H. O. Wright
ATTORNEY

United States Patent Office 2,817,061

Patented Dec. 17, 1957

2,817,061

ASYMMETRICAL DELTA MODULATION SYSTEM

Fritz K. Bowers, Convent, N. J., assignor to Bell Telephone Laboratories, Incorporated, New York, N. Y., a corporation of New York Application June 7, 1955, Serial No. 513,721

7 Claims. (Cl. 332—11)

This invention relates to pulse transmission circuits, such as the so-called "delta modulation" circuits, and has for its principal object the improvement in their sensitivity.

In one simple form of "delta modulation" circuit, signal information is transmitted by the presence or absence of pulses in successive time intervals. The transmitted pulses are applied to identical integrating circuits at the transmitter and the receiver. Assuming that the pulses are negative, the integrating circuits are biased to increase their output level with time. At the transmitter, the output from the integrator is compared with the original signal at a rate which is termed the "sampling frequency." If the instantaneous signal amplitude is less than the output from the integrator at the start of a sampling period, a negative going pulse is transmitted during the sampling interval to reduce the integrator ouptut; while if the signal is larger than the integrator output, no pulse is transmitted during the sampling period, and the output level of the integrator is increased by the positive bias of the integration circuit mentioned above.

In the delta modulation system described above, the nature of the transmitted pulse signals in successive sampling or pulse output intervals is determined by the difference between the input signal and the algebraic sum of previous transmitted pulse indications. This type of system is therefore termed a "difference" pulse transmission system. In other difference pulse transmission systems, pulse codes may be employed to represent the magnitude as well as the sign of the difference signal, or the output pulse train may represent the change in slope of the original signal.

The difference transmission circuits which have been proposed heretofore are symmetrical. As applied to the delta modulation system described above, the term "symmetrical" means that the increase in integrator output level during one complete sampling interval resulting from the biasing effect is exactly equal to the net reduction in output level produced by the presence of a negative going pulse in a given sampling period. This net change of level at the integrator output resulting either from the presence or absence of a pulse is termed a "quantum." Normally, therefore, the signals from the integrators at both the transmitter and the receiver follow the original signals with an error of less than one quantum. When the original signals are less than one quantum in magnitude, however, they may remain undetected. Under these circumstances, no intelligible indication of the presence of the low level signals is transmitted to the receiver.

In accordance with the present invention, the threshold sensitivity of pulse difference transmission circuits is greatly increased by making the pulse generator or integration circuits asymmetric. The resulting varying zero of the encoder uncovers low level signals. For example, referring to the illustrative type of delta modulation described above, the net decrease in integrator output level during a sampling period in which there is a negative output pulse is made significantly different from the increase in output level during a sampling interval in which there is no pulse. Circuitwise, the asymmetry is accomplished by choosing appropriate constants in the pulse generation and integration circuits of the delta modulation transmitter.

Returning to a consideration of prior art delta modulation transmitters, the requirement of symmetry is quite stringent. If the positive increments are slightly different in size from the negative increments produced during successive sampling intervals when the input signal level is low, undesired audio tones are introduced. Accordingly, the pulse generator and integrator of conventional delta modulation transmitters must be made with considerable precision and to high standards of stability.

An advantage of the asymmetric difference transmission system of the present invention is the reduction in stability requirements. When the positive and negative increments are made significantly different, the frequency of the undesired noise which is introduced is above the highest frequency in the signals which are being transmitted. Because these high frequency noise components are filtered out by the low pass filter at the receiver, they do not adversely affect the received signal. Furthermore, because slight changes in the pulse generator or integrating circuit operating conditions only have the effect of shifting the frequency of the noise components which are later eliminated, highly stable operating conditions are not necessary.

Other objects, and various additional features and advantages of the invention will become apparent from the following detailed description of illustrative embodiments thereof taken in conjunction with the attached drawings and the appended claims.

Figure 1:
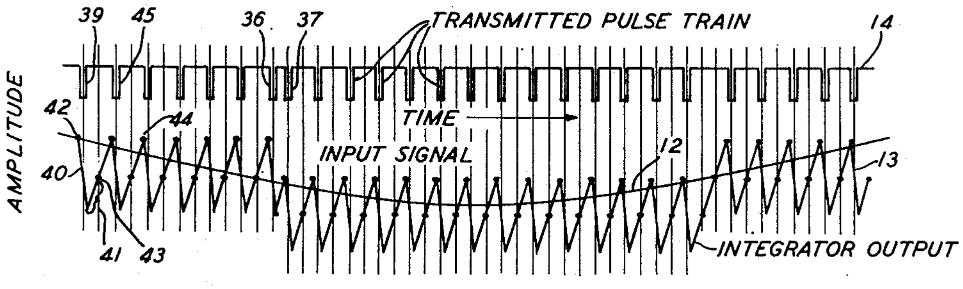
Fig. 1 shows the output of the integrator and the pulse generator of a conventional symmetrical delta modulation circuit when a low level signal is applied thereto.

In Fig. 1, curve 12 is a representative curve of a low level signal which is applied to the input of a conventional delta modulation system. The curves 13 and 14 represent the saw-tooth integrator output and the transmitted pulse train, respectively, of the conventional delta modulation system when the signal 12 is applied thereto.

Figures 2, 3:
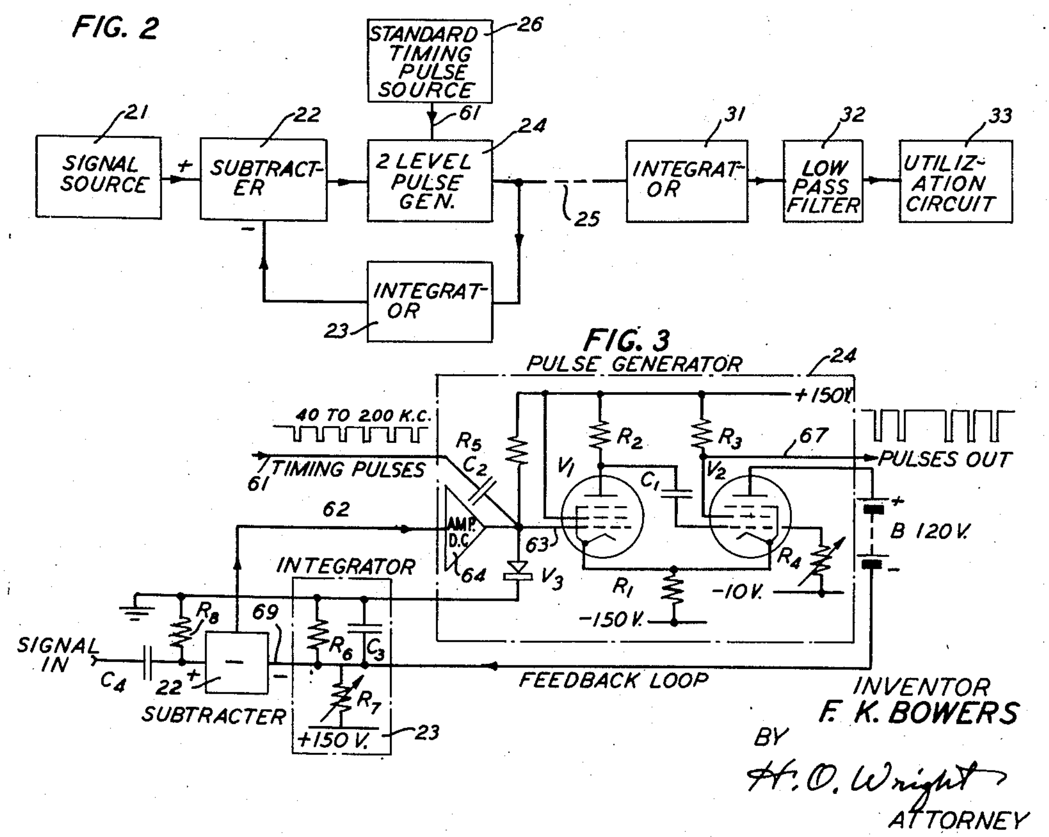
Fig. 2 is a block diagram of a delta modulation transmission system in accordance with the present invention.
Fig. 3 is a detailed circuit diagram showing that portion of the diagram of Fig. 2 which includes the pulse generator and integrator.

Before considering the plots of Fig. 1 in detail, the general mode of operation of delta modulation systems will be reviewed by reference to the block diagram of Fig. 2. In Fig. 2, a source of signals 21 is connected to one input of a subtracter 22. The output of an integrator 23 is coupled to the other input of the subtracter 22. Output pulses from a two level pulse generator 24 are applied to both the integrator 23 and to a transmission medium 25. Gating pulses from a standard timing pulse source 26 enable the pulse generator at a regular preassigned rate. At the time of arrival of a gating pulse, the signal from the subtracter 22 determines the nature of the output signal from the pulse generator. If the subtracter output is negative, indicating that the input signal from the source 21 is less than the output of the integrator 23, the pulse generator produces a negative pulse, and accordingly reduces the integrator output. When the subtracter output is positive, however, indicating that the signal is greater than the integrator output, no pulse is produced, and the positive integrator bias increases the level at the integrator output during the course of a sampling interval. The foregoing mode of operation will be explained in greater detail in connection with Figs. 1 and 4 hereinafter.

The receiver of the delta modulation system of Fig. 2 is made up of an integrator 31, a low pass filter 32, and a utilization circuit 33. The integrator 31 performs the same function as the integrator 23 at the transmitter. Accordingly, the output from integrator 31 normally does not deviate from the signal of the source 21 by more than one quantum.

In accordance with the present invention, the block diagram of Fig. 2 includes an asymmetric pulse generator 24 or integration circuit 23, such as are shown in detail in Fig. 3. However, the over-all blocks shown in the block diagram of Fig. 2 are also applicable to delta modulation systems of the prior art. Therefore, the pulse patterns shown in Fig. 1 will be described by reference to Fig. 2.

In Fig. 1, the negative pulses in the transmitted pulse train 14 appear at the output of pulse generator 24. In addition, the closely spaced light vertical lines indicate the occurrence of enabling pulses from the standard timing pulse source 26. In observing the pulse train 14, it may be noted that the actual output pulses as shown in 14 only occur in approximately every other sampling period, as indicated by the light vertical lines. However, occasionally, as indicated by the pulses 36, 37, two pulses occur during successive sampling intervals. In Fig. 1, the pulses in the pulse train 14 are shown as negative pulses. These negative pulses result in a corresponding negative increment at the output of the integrator 23, as indicated by the steeper portions of the plot 13. For example, the occurrence of the pulse 39 produces the negative increment 40 in the characteristic 13. During the remainder of the sampling interval, the positive bias in the integrator circuit produces a positive increment of voltage indicated at 41 in the plot 13. At the time of the occurrence of the pulse 39, the output from the integrator 23 is that indicated at point 42. Because the value indicated at point 42 is more positive than the input signal 12 at that time, the negative pulse 39 is applied to the integrator 23 to reduce its output level. During one sampling interval, the net reduction in the integrator output is the difference in level between point 42 and point 43. The next following enabling pulse from the standard pulse source 26 occurs when the integrator output is at point 43. However, because point 43 lies below curve 12, the integrator output is more negative than the input signal at that point, and no additional negative pulse is required. During the following sampling interval, the positive bias on the integrator 23 results in a further increase of the integrator output to point 44. At this point, the integrator output is greater than the input signal, and accordingly, the output pulse 45 is produced. From the foregoing description of the first few pulses, the balance of the characteristic 13 can readily be developed. The important thing to note about the symmetrical delta modulation encoder illustrated by the plots 12 and 13 is that the net positive increase resulting from the presence of a pulse is exactly equal to the net decrease of the integrator output resulting from the absence of a pulse. Under these circumstances, the integrator output is made up of a series of saw-tooth waves at one level followed by another series of saw-tooth waves at another level one quantum higher. The recovered signal, therefore, contains no indication of the value of the original signal 12, within one quantum interval.

In accordance with the circuits of the present invention, the positive and negative increments are made substantially different. Thus, for example, in Fig. 4, the saw-tooth curve 51 resulting from the train of negative pulses 52 does not include groups of saw-tooth waves at one level and then another level, as in Fig. 1. Instead, the saw-tooth curve 51 progressively increases or decreases in level. The initial point in curve 51 is designated 54. Because this point is more positive than the input signal 50, a negative pulse 55 is produced. After another sampling interval in which no output pulse is present, the integrator output is that indicated at point 56. Unlike characteristic 13 of Fig. 1, the absence of a pulse does not bring the output voltage of the integrator back to its original level but instead, brings it to the point 56 which is significantly lower than its original level, as indicated by point 54. The resulting saw-tooth wave form 51 follows the characteristic 50 quite closely. When the saw-tooth wave form is passed through a low pass filter, the resulting output wave is very nearly an exact reproduction of the original characteristic 50. Thus, the poor threshold sensitivity inherent in prior symmetric delta modulation systems as illustrated in Fig. 1 is avoided by the asymmetry disclosed in the plots of Fig. 4.

Referring to Fig. 3, the exact circuitry of an illustrative asymmetric pulse generator and integrator circuit arrangement will now be disclosed. The pulse generator 24 is essentially a one-shot multivibrator which includes vacuum tubes $V_1$ and $V_2$. Under normal conditions, the tube $V_1$ is biased to its conducting state, and the tube $V_2$ is in the nonconducting state. The two input circuits to the pulse generator 24 are a lead 61 from the standard timing pulse source 61 and a lead 62 from the subtracter 22. Lead 61 is coupled to control grid 63 of the tube $V_1$ by condenser $C_2$, and lead 62 is connected to the same grid 63 by a direct current amplifier 64. When the output from the subtracter 22 is negative at the time of arrival of a negative timing pulse on lead 61, the tube $V_1$ is cut off. A coupling condenser $C_1$ interconnects the plate of tube $V_1$ and the control grid of tube $V_2$. As the plate voltage of tube $V_1$ rises, the coupling condenser $C_1$ drives the control grid of tube $V_2$ positive and tube $V_2$ becomes conducting. A negative output pulse accordingly appears at lead 67. The time constant of the condenser $C_1$ and a variable resistance $R_4$ determines the conduction period of the tube $V_2$. The output pulse width may therefore be controlled by varying the potentiometer $R_4$.

The integrator circuit 23 is made up of a resistor $R_6$ and a capacitance $C_3$, forming a conventional integration circuit, and a positive biasing potentiometer $R_7$. When the tube $V_2$ conducts, an increment of negative charge is applied to the condenser $C_3$, and output 69 of the integrator 23 becomes more negative. The integrator 23 is biased positively, the amount of bias being controlled by the adjustment of the potentiometer $R_7$. The relative magnitudes of the negative increments resulting from pulses at the output of the pulse generator 24 and the positive bias resulting from the potentiometer adjustment will be discussed in greater detail hereinafter in connection with Fig. 4.

Other circuit elements in Fig. 3 are generally conventional, and will now be described briefly. Resistor $R_1$ is a common cathode load resistor for the two tubes $V_1$ and $V_2$. Resistor $R_2$ in the plate circuit of tube $V_1$ is sufficiently large to make the action of the two tubes regenerative. Resistor $R_3$ in the screen grid circuit of tube $V_2$ is employed as a pulse output impedance. A diode $V_3$ is employed to clamp the control grid 43 of the tube $V_1$ at zero potential under normal operating conditions. Resistance $R_5$, together with the positive voltage connected thereto, maintains a positive current flowing through the diode $V_3$ to ground. The negative increments of charge from the timing pulses on lead 61 and the negative charge from the direct current amplifier 64 must overcome the positive current passing through resistor $R_5$ before the tube $V_1$ is cut off. A battery B is shown in series with the plate of tube $V_2$ and the input to the integrator 23. In actual practice, the voltage represented by the battery B is introduced by means of taps on a resistance. This arrangement is employed to maintain the input to the integrator 23 at approximately ground potential. Condenser $C_4$, together with a resistor $R_8$, determine the signal cut-off frequency at the lower end of the transmission band.

By way of example, the following values of circuit components may be employed in Fig. 3;

| | |
|---|---|
| Tubes $V_1$, $V_2$ | 6AU6 pentodes. |
| Resistor $R_1$ | 15,000 ohms. |
| Resistor $R_2$ | 4,700 ohms. |
| Resistor $R_3$ | 470 ohms. |
| Potentiometer $R_4$ | 100,000 ohms. |
| Capacitor $C_1$ | 50 micro-micro-farads. |
| Diode $V_3$ | Type 400A, Western Electric diode. |
| Resistor $R_5$ | 47,000 ohms. |
| Capacitor $C_2$ | 25 micro-micro-farads. |
| Battery B | 120 volts. |
| Capacitor $C_3$ | .1 micro-farads. |
| Resistor $R_6$ | 47,000 ohms. |
| Potentiometer $R_7$ | 500,000 ohms. |
| Capacitor $C_4$ | .1 micro-farads. |
| Resistor $R_8$ | 100,000 ohms. |

Figure 4:
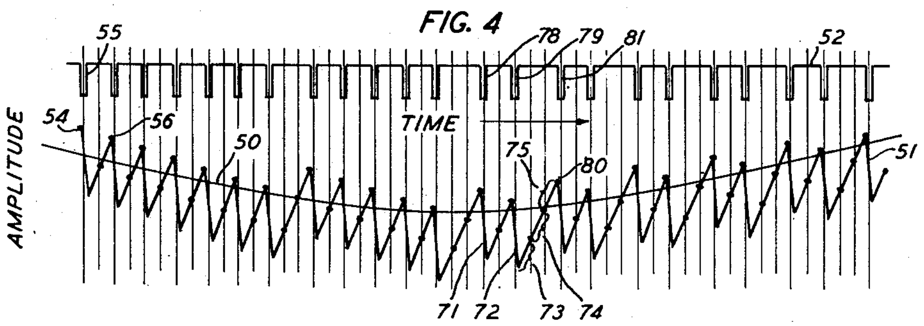
Fig. 4 shows the output of the integrator and the pulse generator of the asymmetric delta modulator illustrated in Figs. 2 and 3 when a low level signal is applied thereto.

In Fig. 4, the saw-toothed integrator output characteristic 51 is made up of steep downward sloping portions such as 71, 72, and relatively gradual upward sloping portions such as 73, 74 and 75. The steep downward sloping portions are a result of the negative pulses applied from the plate of tube $V_2$ to the integrator circuit 23 of Fig. 3. Thus, in Fig. 4, the steep portions 71, 72 of the characteristic 51 result from the output pulses 78, 79 in pulse train 52.

In Fig. 4, as in Fig. 1, successive sampling intervals are designated by light vertical lines. Thus, during the sampling interval following the occurrence of pulse 79, the integrator output 51 initially drops abruptly, as indicated at 72, and then gradually increases in level as indicated at 73. The gradually increasing portion 73 of the characteristic 51 results from the positive biasing circuit including the potentiometer $R_7$ of Fig. 3. Negative output pulses only occur when the integrator output is more positive than the signal input at the beginning of a sampling period. The integrator output gradually increases during the two sampling intervals following the occurrence of pulse 79, as indicated by the portions 74 and 75 of the plot 51. At point 80, however, at the beginning of the next sampling interval, the integrator output 51 is more positive than the input signal 50. Accordingly, the pulse 81 is produced to abruptly reduce the integrator output once more.

As mentioned above, the asymmetry of the present circuits must be significant to avoid introducing noise within the signal band. When an asymmetric system is employed, and when the input signal is constant, an extra pulse is introduced (or a pulse is omitted) periodically to compensate for the integrator bias. To avoid distortion, the frequency at which an extra pulse is introduced (or omitted) must be greater than the highest frequency in the transmitted signal, and it should preferably be about twice this frequency to avoid noise resulting from difference frequencies.

The limitations set forth in the preceding paragraph will now be considered as applied to the transmission of an audio signal over an asymmetric delta modulation system. To obtain adequate transmission, the frequency of sampling ($f_s$) should be very much higher than the highest frequency ($f_o$) in the signal band which is being transmitted, and which is passed by the low pass filter at the receiver. The sampling frequency chosen depends on the transmission quality desired, and may, by way of example, be twenty times $f_o$. The number of samples taken during one period or cycle of a signal of frequency $f_o$ is equal to $f_s/f_o$. In order for the noise introduced by asymmetry in the pulse generator and integrator to be about $2f_o$, the extra pulse (or the omission of a pulse) which occurs when a steady signal is applied to an asymmetric delta modulator should occur about twice during one period of the signal of frequency $f_o$. This corresponds to the introduction (or omission) of one extra pulse every $f_s/2f_o$ pulses, or the introduction of one extra pulse in ten sampling intervals in the example given above, in which the sampling frequency was twenty times the highest signal frequency. Thus, for example, in the central portion of Fig. 4 when the signal 50 is moderately steady, the pattern of pulses and spaces in successive sampling intervals is interrupted by an extra space (or no pulse) about once every six or eight sampling intervals.

To maintain the frequency of the noise introduced by asymmetric pulse generator and integrator circuits above $2f_o$, it has been shown that the rate of extra pulses (or the omission of pulses) must be less than the ratio of the sampling frequency ($f_s$) to twice the highest frequency which is being transmitted ($2f_o$). For the conditions proposed in the preceding paragraph, an adequate ratio of $f_s/2f_o$ is 10. To cause the omission of one pulse every ten sampling intervals in the circuit of Fig. 3, the net increase in level in one sampling interval resulting from the positive bias of the integrator would have to be one-fifth less than the net decrease in level over one sampling interval when a negative output pulse is present during the sampling interval. Under these circumstances, after five pairs of positive and negative increments in which the positive increment is always one-fifth less than the negative increment, the next subsequent negative pulse is omitted in order to compensate for the negative trend. Thus, the positive and negative increments differ from each other by about four times the ratio $f_o/f_s$. To provide an adequate margin of safety, a slightly larger factor should normally be employed. Thus, in Fig. 4, where the ratio of signal frequency to the sampling frequency is one-twentieth, and four times this ratio is one-fifth, the positive increments were adjusted to be one-fourth less than the negative increments.

Referring to Fig. 3, the relative magnitudes of the positive and negative increments of voltage at the integrator output 69 may be adjusted by varying the potentiometers $R_4$ and $R_7$. For example, the pulse width may be increased or decreased by increasing or decreasing, respectively, the value of the potentiometer $R_4$. Similarly, the positive bias of the integrator 23 may be increased or decreased by varying the potentiometer $R_7$. In actual practice, the system may be adjusted by varying either potentiometer $R_4$ or $R_7$ while listening to a loudspeaker connected to the integrator 31 in Fig. 2, and with no voltage or a constant voltage level applied at 21. As the potentiometer is varied, the audio output varies in pitch. When positive and negative increments are equal, there is no audio output. As one of the potentiometers is varied slightly, a low audio note is heard. As the potentiometer is varied further, the audio note increases in pitch, until it passes above the highest signal frequency $f_o$. The potentiometers $R_4$ and $R_7$ of Fig. 3 were adjusted until the audio tone was about twice the top signal frequency, and clamped in the adjusted position. The loudspeaker was then disconnected from the integrator 31, and the low pass filter 32 and utilization circuit 33 were connected thereto. In the circuit of Figs. 2 and 3, therefore, the positive increments of voltage at the integrator output differ from the negative increments of voltage by a factor of at least twice and preferably about four times the ratio of the maximum transmitted signal to the sampling frequency. In the present specification and claims, when the positive and negative increments are said to be "substantially" or "significantly" different in magnitude, these terms are to be construed as complying with the requirements detailed above for avoiding received signal distortion.

The principles of asymmetric delta modulation encoding are also applicable to other forms of delta modulators than that described above. For example, some delta modulation systems employ positive instead of negative output pulses, and others use positive and negative pulses, instead of negative pulses in combination with a positively biased integration circuit. Systems of this type are shown, for example, in the copending application Serial No. 508,608 of F. K. Bowers, filed May 16, 1955, and entitled "Delta Modulation Compander." In all of these systems, the threshold sensitivity may be greatly increased by making the positive and negative increments significantly different, as discussed above. In the systems in which positive and negative pulses are transmitted, for example, the asymmetry may be introduced by changing the amplitude or width of positive pulses as compared with negative pulses. The principles of the invention may also be applied to a many digit delta system as described by H. van de Weg in "Quantizing Noise of a Single Integration Delta Modulation System with an N-Digit Code," Phillips Research Reports, volume 8, page 367, 1953.

It is to be understood that the above-described arrangements are illustrative of the application of the principles of the invention. Numerous other arrangements may be devised by those skilled in the art without departing from the spirit and scope of the invention.

What is claimed is:

1. In a pulse transmission system, an output pulse generator having a predetermined pulse output period, an integration circuit coupled to the output of said pulse generator, a source of signal information, means for comparing the output signal from said integrator with the output from said source of signal information and for indicating which signal is greater, said comparison means being coupled to said pulse generator, means for increasing the signal output level from said integrating circuit by a predetermined amount during a pulse period when said comparison means indicates that the signal source is greater than the integrator output, and means for decreasing the signal output level from said integrating circuit by a significantly different amount during a pulse period when said comparison means indicates that the signal source is less than the integrator output.

2. In a pulse transmission system, an output pulse generator having a predetermined pulse output period, an integration circuit coupled to the output of said pulse generator, a source of signal information, means for comparing the output signal from said integrator with the output from said source of signal information and for indicating which signal is greater, said comparison means being coupled to said pulse generator, means for increasing the signal output level from said integrating circuit by a predetermined amount during a pulse period when said comparison means indicates that the signal source is greater than the integrator output, and means for decreasing the signal output level from said integrating circuit during a pulse period by an amount which differs from said predetermined amount by a factor of more than twice the highest desired frequency of the signals from said signal source divided by the sampling rate of said pulse generator when said comparison means indicates that the signal source is less than the integrator output.

3. In a pulse transmission system, an output pulse generator having a predetermined pulse output period, an integration circuit coupled to the output of said pulse generator, a source of signal information, subtraction means for determining the difference between the output signal from said integrator and the signal from said source of signal information, said subtraction means being coupled to said pulse generator, means for increasing the output level of said integrating circuit by a predetermined amount during a pulse period when the sign of said difference is of one polarity, and means for decreasing the signal output level from said integrating circuit during a pulse period by an amount which differs from said predetermined amount by a factor of more than one-tenth said predetermined amount, when the sign of said difference is of the opposite polarity.

4. In a pulse transmission system, an output pulse generator having a predetermined pulse output period, an integration circuit coupled to the output of said pulse generator, a source of signal information, subtraction means for determining the difference between the output signal from said integrator and the signal from said source of signal information, said subtraction means being coupled to said pulse generator, means for increasing the output level of said integrating circuit by a predetermined amount during a pulse period when the sign of said difference is of one polarity, and means for decreasing the signal output level from said integrating circuit by a significantly different amount during a pulse period when the sign of said difference is of the opposite polarity.

5. In a pulse transmission system, an output pulse generator having a predetermined pulse output period, a subtracter, an integrator, circuit means connecting said pulse generator, said subtracter and said integrator in a series circuit loop, a source of signal information, means for coupling said source to one input of said subtracter, the feedback loop from the output of said pulse generator being connected to the other input of said subtracter, means for increasing the electrical signal level contributed by said feedback loop at the input to said pulse generator by a predetermined amount during a pulse period when said subtracter output is positive, and means for decreasing the signal level contributed by said feedback loop at the input to said pulse generator by a substantially different amount than said predetermined amount during a pulse period when said subtracter output is negative.

6. In a difference transmission system, means for transmitting timed pulse indications of a signal which is to be transmitted, means for storing a cumulative representation of signals which have been transmitted, said storage means including means for changing said representation by an incremental voltage of a predetermined magnitude in response to positive output signal indications, and for changing said representation by an incremental voltage of opposite sign and of significantly different magnitude in response to negative output signal indications.

7. In a pulse transmission system including a transmitter and a receiver, said receiver comprising a low pass filter, an integrator and a utilization circuit connected in series; and said transmitter comprising an output pulse generator having a predetermined pulse output period, an integration circuit coupled to the output of said pulse generator, a source of signal information, means for comparing the output signal from said integrator with said source of signal information and for indicating which signal is greater, said comparison means being coupled to said pulse generator, means for increasing the signal output level from said integrating circuit by a predetermined amount during a pulse period when said comparison means indicates that the signal source is greater than the integrator output, and means for decreasing the signal output level from said integrating circuit during a pulse period by an amount which differs from said predetermined amount by a factor of more than twice the upper cut-off frequency of said low pass filter divided by the sampling rate of said pulse generator when said comparison means indicates that the signal source is less than the integrator output.

References Cited in the file of this patent

FOREIGN PATENTS 987,238 France ---------------- Apr. 11, 1951